INVENTOR.
JACK AVINS
BY Eugene M. Whitacre
ATTORNEY

Dec. 11, 1962 J. AVINS 3,068,475

STEREOPHONIC SOUND SIGNALLING SYSTEM

Filed Oct. 7, 1959 2 Sheets-Sheet 2

INVENTOR.
Jack Avins
BY Eugene M. Whitmore
ATTORNEY 3,068,475

STEREOPHONIC SOUND SIGNALLING SYSTEM

Jack Avins, Staten Island, N.Y., assignor to Radio Corporation of America, a corporation of Delaware Filed Oct. 7, 1959, Ser. No. 844,940
10 Claims. (Cl. 343—200)

This invention relates to the radio transmission and reception of stereophonic sound information and, more particularly, to stereophonic sound radio transmitting and receiving apparatus capable of compatible operation with existing amplitude modulation transmitting and receiving equipment used in the standard broadcast band and within the bandwidth requirements of the standard broadcast band.

In order to transmit a modulated radio frequency wave which provides stereophonic sound reproduction when received and reproduced by a suitable receiver, it is necessary to radiate from the transmitter a wave which contains information concerning at least two stereophonically related audio frequency signals. A number of systems have been proposed which are useful within the standard broadcast band and which are compatible, to varying degrees, in that the transmitted wave, which contains stereophonic information, may be received and utilized as a monophonic signal in a conventional broadcast band receiver.

One method of deriving a pair of stereophonic audio frequency signals from a sound source is by the proper placement of at least two microphones, or other sound pickup devices, with respect to the sound source. The audio frequency signal from one microphone may be designated the A signal, and the audio frequency signal from the other microphone may be designated the B signal. To insure that a radio frequency wave modulated by such signals can be received and reproduced by a standard broadcast band receiver, the A and B signals are mixed to provide two stereophonically related signals, one of which may be the sum of the A and B signals $(A+B)$ and the other of which may be the difference of the A and B signals. $(A-B)$.

In certain proposed broadcast systems, a function of the $(A+B)$ signal is used to amplitude modulate the carrier wave of the transmitter while a function of the $(A-B)$ signal is used to angle modulate the carrier wave of the transmitter. In this manner, the amplitude or envelope modulation on the radio frequency wave contains the sum of the A and B signals and can be received and reproduced by a standard broadcast band receiver with little degradation of monophonic performance. A stereophonic receiver derives the $(A+B)$ signal from the wave by means of an amplitude modulation detector, i.e., an envelope detector, and derives the $(A-B)$ signal from the wave by means of an angle modulation detector. The $(A+B)$ and $(A-B)$ signals are combined in a matrixing circuit to produce the individual A and B signals, which are, in turn, applied to separate sound reproducing devices to provide stereophonic sound reproduction.

The differences between certain proposed stereophonic sound broadcasting systems for use within the standard broadcast band arise in the manner of amplitude modulating and angle modulating the transmitter with the $(A+B)$ and the $(A-B)$ information; and in the manner of detecting the information at the stereophonic receiver. One of the proposed systems of angle and amplitude modulating the carrier wave for transmitting the stereophonic signals is described and claimed in a copending application for Avins and Holt, Serial No. 799,680, filed March 16, 1959, and entitled Multiplicative Stereophonic Sound Signalling System.

It is an object of this invention to provide an improved, stereophonic sound signalling system capable of compatible operation within a broadcast band channel.

It is another object of this invention to provide an improved, compatible stereophonic sound signalling system in which the signal containing the stereophonic information may be detected by a simple amplitude and angle detector circuit.

It is yet another object of the present invention to provide an improved stereophonic sound signalling transmitter capable of producing and transmitting a stereophonic wave which may be received and reproduced by a simple, inexpensive stereophonic receiver, or which may be monophonically reproduced by a standard broadcast band receiver.

It is a further object of the invention to provide an improved detector circuit for demodulating a wave modulated in amplitude and angle with stereophonic information that is simple in operation and economical of construction.

These and other objects of the invention are achieved, briefly, by a system wherein at the transmitter the angle modulating signal is not only a function of the difference of a pair of stereophonically related signals, but is also an inverse function of the sum of these signals while the amplitude modulating signal is derived directly from the sum of these signals. The transmitted resultant modulated wave is preferably detected at the receiver by a novel detector circuit to provide the $(A+B)$ and $(A-B)$ signals.

Additionally, a wave modulated by sterephonic signals in accordance with the invention maintains the significant portion of the intelligence signals within a bandwidth comparable with twice the highest modulating frequency and a receiver of normal bandwidth does not appreciably distort the received wave.

Another feature of the invention includes circuitry to provide both envelope and angle detection in a single, inexpensive detector circuit.

The invention may be better understood, however, when read in connection with the accompanying drawings, in which.

As has been previously mentioned, in certain of the proposed systems for boadcasting stereophonic information, the individual stereophonic signals A and B, which are generated at the broadcasting studio, are combined to produce sum and difference signals, that is $(A+B)$ and $(A-B)$ signals. This is done in order to provide a compatible amplitude modulated signal; the sum signal $(A+B)$ is utilized to amplitude modulate the carrier wave, i.e., vary the envelope of the carrier wave, so that a monophonic receiver detects the sum of the signals picked up at the broadcasting studio. The function of a stereophonic receiver is to derive a pair of output signals corresponding to the $(A+B)$ and $(A-B)$ signals at its detector circuits which are then utilized to derive the A and B signals. It is desirable to transmit the $(A+B)$ as amplitude modulation to insure compatibility with existing monophonic receivers, but the stereophonically related signal which is broadcast as angle modulation need not correspond exactly to the $(A-B)$ signal; it may be a signal suitably related to the $(A-B)$ signal, to be utilized by the receiver to generate the $(A-B)$ signal. The stereophonic system, in accordance with this invention, includes a carrier wave which is angle modulated as a direct function of the $(A-B)$ signal and as an inverse function of the $(A+B)$ signal and is amplitude modulated by the $(A+B)$ signal concurrently.

This transmitted modulated wave is detected in the receiver by a discriminator circuit to directly provide the $(A-B)$ signal despite the fact that the $(A-B)$ signal per se is not transmitted as a separate distinct modulation signal component. This action will be explained in more detail hereinafter. Briefly, however, as the envelope of a constant angle modulated wave changes in amplitude, the angle responsive output from a frequency modulation detector or discriminator increases in amplitude as the envelope increases and decreases as the envelope decreases despite the fact that the amount of angle modulation on the wave has not been altered. Accordingly, by causing the angle modulation to be an inverse function of the $(A+B)$ signal, i.e., the envelope modulation, the crests of the envelope modulation are accompanied by a decrease in the angle modulation and the troughs of the envelope modulation are accompanied by an increase in the angle modulation. The result is that the detector provides an output representative of the $(A-B)$ signal.

Figures 1, 2:
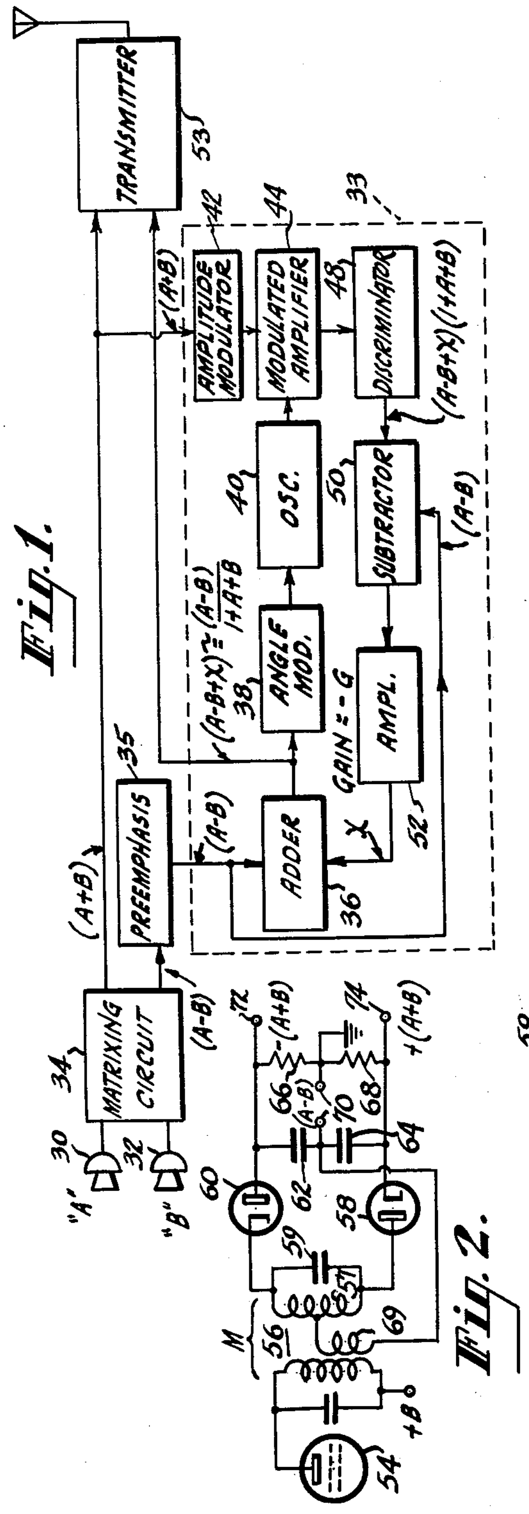
FIGURE 1 is a block diagram of a transmitter circuit for generating and transmitting a modulated radio frequency wave containing information regarding a pair of stereophonically related signals in accordance with the present invention.
FIGURE 2 is a schematic circuit diagram of a detector circuit for demodulating both the amplitude and angle modulation of a wave modulated in accordance with the present invention.

A circuit for generating, at the transmitter, an angle modulating signal related to the $(A-B)$ and $(A+B)$ signals such that the angle modulation on the carrier wave is a direct function of the $(A-B)$ signal and an inverse function of the amplitude of the carrier envelope modulated by the $(A+B)$ signal is shown in FIGURE 1. A pair of stereophonic signals (A and B) are generated by a pair of spaced microphones 30 and 32 indicated as the "A" and "B" microphones, respectively, which pick up sound signals from a source. Other generators of the A and B signals may be used, such as magnetic tape or phonograph recordings. The pair of signals are applied to a matrixing circuit 34. As is known, the matrixing circuit adds and subtracts the A and B signals and provides a sum signal $(A+B)$ and a difference signal $(A-B)$, as indicated on the drawing. The $(A+B)$ signal is applied directly to a main transmitter 53 of the type designed to be concurrently amplitude and angle modulated as the amplitude modulating signal, and the $(A-B)$ and $(A+B)$ signals are applied to a signal modifying circuit 33 (enclosed within the dotted box). Specifically, the $(A-B)$ signal is applied through a preemphasis circuit 35 (for example as described in the aforementioned Avins and Holt application) as one input signal to an adder circuit 36, together with a second input signal, which has been designated as $x$. The adder 36 provides an output signal which is the sum of the $(A-B)$ signal and the $x$ signal, or $(A-B+x)$. The $(A-B+x)$ signal is applied to an angle modulator 38 to angle modulate the radio frequency oscillator 40. The output wave from the oscillator 40 is thus a radio frequency wave angle modulated by the signal $(A-B+x)$. This output wave is applied to modulated amplifier 44 where the angle modulated wave is amplitude modulated by the $(A+B)$ signal by amplitude modulator 42. The output from modulated amplifier 42 is accordingly a radio frequency wave which is modulated in angle by the $(A-B+x)$ signal and concurrently in amplitude by the $(A+B)$ signal.

In accordance with the invention, the angle modulation of the wave generated by transmitter 53 is made a direct function of the $(A-B)$ signal and an inverse function of the amplitude of the transmitted wave envelope. In order to generate an $x$ signal such that the angle modulation is controlled as desired, the angle and amplitude modulated output wave of modulated amplifier 44 is applied to a balanced discriminator circuit 48 without being limited or stripped of its amplitude modulation. The discriminator circuit 48 provides at its output a signal which is proportional to the product of the angle modulation and the concurrent amplitude of the carrier envelope. One discriminator circuit which may be used for this purpose is described in a patent to Seeley, No. 2,101,103. The angle modulation is, of course, determined by the $(A-B+x)$ signal and amplitude of the carrier envelope is proportional to $(1+A+B)$. Thus, the detected output signal of the discriminator 48 is:

$$(A-B+x)(1+A+B) \tag{1}$$

The output signal from the discriminator 48 is applied as one input signal to a subtractor circuit 50, which has applied, as a second input signal thereto, the $(A-B)$ signal.

The output signal of the subtractor 50:

$$(A-B+x)(1+A+B)-(A-B) \tag{2}$$

is fed to an amplifier 52 which has a gain of $-G$. The output signal of the amplifier 52:

$$-G[(A-B+x)(1+A+B)-(A-B)] \tag{3}$$

is applied as the $x$ signal to the adder 36. The significance of the negative sign for the gain of amplifier 52 is to indicate a phase reversal, i.e., a negative rather than positive feedback loop.

The equation for the $x$ signal can now be written. Thus, $$x=-G[(A-B+x)(1+A+B)-(A-B)] \tag{4}$$

In order to determine the character of the output signal from the discriminator, Equation 4 is solved for the term $(A-B+x)(1+A+B)$, which is:

$$(A-B+x)(1+A+B)=-\frac{x}{G}+(A-B) \tag{5}$$

The absolute gain, G, of the amplifier 52, is made very large. Accordingly, the term $$-\frac{x}{G}$$

in Equation 5 is insignificantly small compared to the other terms and (5) reduces to:

$$(A-B+x)(1+A+B)=(A-B) \tag{6}$$

Because the left hand term of (6) is the discriminator 48 output (1) then the discriminator output is $(A-B)$.

In order to determine the character of the angle modulating signal supplied to angle modulator 38, Equation 4 can be solved for $(A-B+x)$, which results in $$(A-B+x)=\frac{-\frac{x}{G}+(A-B)}{1+(A+B)}\approx\frac{(A-B)}{1+(A+B)} \tag{7}$$

Note that the exact solution for the $(A-B+x)$ includes the $$-\frac{x}{G}$$

term in the numerator of the equation. Since it has been specified that the gain of the amplifier 52 is so large as to make the term $$-\frac{x}{G}$$

insignificant compared to $(A-B)$, the equation reduces to show that the angle modulating signal supplied to angle modulator 38 is an inverse function of the amplitude of the envelope $(1+A+B)$ and a direct function of the $(A-B)$ signal.

The frequency of the oscillator 40 is advantageously made higher than the frequency of the carrier wave which is to be transmitted by the main transmitter 53. This is done in order to reduce time delays which may be occasioned if the generation of the $$\frac{(A-B)}{(1+A+B)}$$

signal is attempted at the carrier wave frequency of the main transmitter 53. The $$\frac{(A-B)}{(1+A+B)}$$

signal is taken from the output of the adder 36 and applied to the main transmitter 53 to provide the angle modulating signal for the transmitter 53. The $(A+B)$ signal is, as stated before, applied to the main transmitter 53 to amplitude modulate the carrier wave. In order for the modification applied to the angle modulating signal of the main transmitter to be correct, the main transmitter must be amplitude modulated by the $(A+B)$ signal by the same percentage that the amplitude modulator 42 modulates the signal from the oscillator 40 in the signal modifying circuit 33. Because of the compensating effect of inversely angle modulating the carrier wave with a component representative of the concurrently $(A+B)$ modulated envelope of the wave, the energy in side band components of the radiated composite modulated wave that lie outside of the normal amplitude modulation spectrum tend to be reduced.

It is advantageous that the dynamic range of the A and B signals be limited (not shown) prior to being matrixed so that the magnitude of the angle modulation does not become excessively large during intervals of trough envelope modulation. Consider, in this connection, that if the amplitude modulation approaches 100%, the amplitude of the wave envelope at the trough becomes very small. Since the deviation is inversely proportional to the amplitude of the wave, the deviation would become very large. Known compression amplifier techniques at the transmitter may be employed to limit the percentage of amplitude modulation to any desired amount.

In particular, if A and B are separately limited so that each channel by itself can modulate the wave envelope up to a maximum of 50%, then it can be shown that the value of $(A-B)$ vanishes as the troughs corresponding to 100% envelope modulation are approached, so that, when the deviation is multiplied by the inverse of the envelope, the system deviation is never exceeded.

Figure 5:
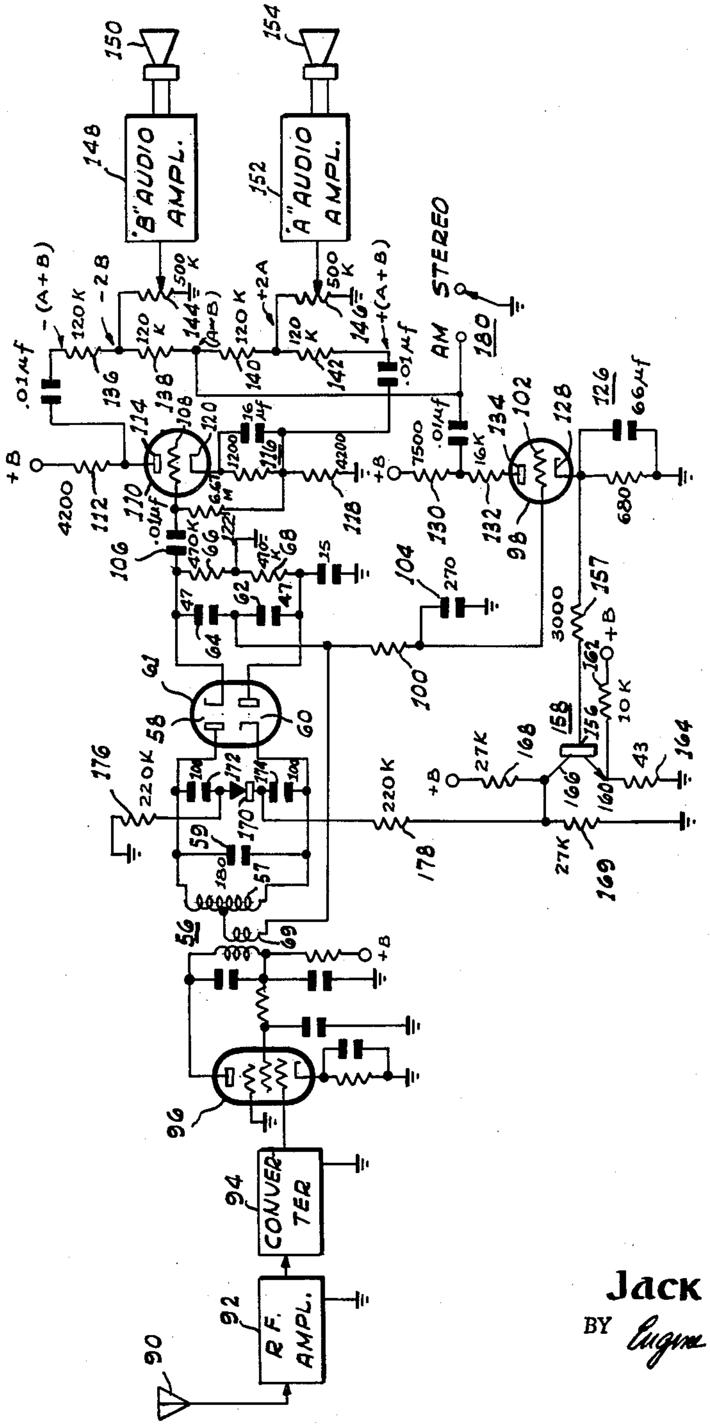
FIGURE 5 is a schematic circuit diagram of a stereophonic receiver illustrating a combined amplitude and angle modulation detector circuit in accordance with the invention.

In order to demodulate, without substantial distortion, a wave of the type described in connection with FIGURE 1 and to obtain both the amplitude modulated and angle modulated components of the carrier signal from a single circuit, a detector circuit such as shown in FIGURE 2 may be utilized. The circuit has been illustrated as being driven from an intermediate frequency amplifier 54. The radio frequency amplifier, converter, and intermediate frequency amplifier circuits preceding the detector circuit of FIGURE 2 have not been shown in this figure and may be of an entirely conventional nature. (A more complete circuit of a receiver, together with another form of a combined detector, is shown in FIGURE 5.) A received wave is applied to the tuned primary winding of a balanced, phase-shift transformer 56. Such balanced, phase-shift transformers are well known and have been used in the past, for instance, in circuits such as the Foster-Seeley FM detector and the FM ratio detector. The secondary winding 57 of the transformer 56 is tuned to the frequency of the received wave by a capacitor 59, and the winding has one extremity connected to the anode of a first diode 58 and the other extremity connected to the cathode of a second diode 60. The cathode of the first diode 58 and the anode of the second diode 60 are connected together through two paths, firstly, the series combination of a first and second load capacitor 62 and 64, and secondly, the series combination of a pair of load resistors 66 and 68. A tertiary winding 69 on the transformer 56 is slightly coupled, inductively, to the primary winding, and has one extremity electrically connected to the mid-point of the secondary winding 57 and the other extremity to the junction of the capacitors 62 and 64 to establish the mid-point of the secondary at the alternating potential of a point on the primary winding. The junction of the resistors 66 and 68 is connected to ground or a point of reference potential for the detector.

Figure 3:
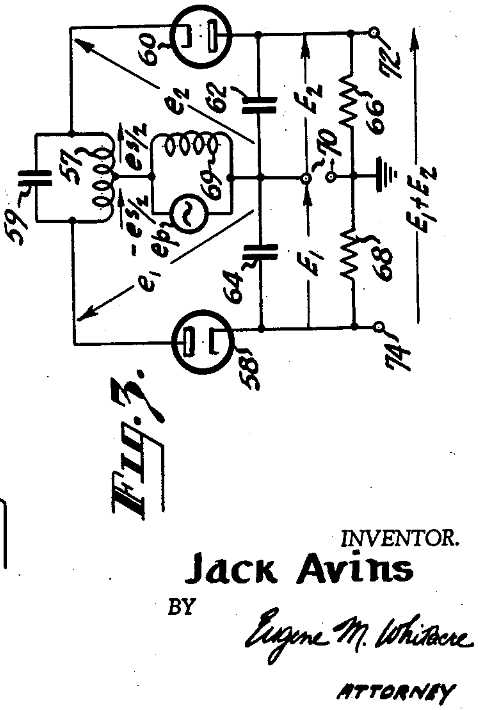
FIGURE 3 is a schematic circuit diagram of an equivalent circuit of the detector circuit shown in FIGURE 2.

The operation of the detector circuit of FIGURE 2 can be best explained with reference to FIGURES 3 and 4. In FIGURE 3, the circuit has been redrawn to more clearly indicate the voltage relationships that exist in the circuit. Assume that a wave, unmodulated in frequency or amplitude, is applied to the primary winding of the transformer 56 (see FIGURE 2). A voltage, $e_s$, appears in the secondary winding 57, because of inductive coupling to the primary, and may be considered as two separate voltages, $$\frac{e_s}{2}$$

between the mid-point and the extremities of the secondary winding 57. A voltage $e_p$ appears across the tertiary winding 69 between the mid-point of the secondary winding 57 and the junction of the capacitors 62 and 64, which is related in fixed phase to the phase of the primary voltage because of the tight coupling of the tertiary winding 69 to the primary winding. This tertiary voltage serves as a reference voltage. The reference voltage $e_p$ vectorially combines with the voltage $$\frac{e_s}{2}$$

across the left portion of the secondary winding 57 (as viewed in the drawing) to produce the voltage $e_1$ across the first diode 58. In like manner the voltage $e_p$ vectorially combines with the voltage $$\frac{e_s}{2}$$

across the right portion of the secondary to produce the voltage $e_2$ across the second diode 60. When the voltage $e_p$ has the same frequency as the resonant frequency of 57, 59, $e_p$ and $e_s$ are in quadrature, one half the secondary having a leading 90° phase and the other half a lagging 90° phase with respect to $e_p$. The diodes 58 and 60 rectify the voltages $e_1$ and $e_2$, respectively, to produce the rectified voltages $E_1$ and $E_2$, respectively, across the capacitors 64 and 62, respectively. At center frequency, that is, with only an unmodulated wave applied to the transformer, the voltages $e_1$ and $e_2$ and hence $E_1$ and $E_2$ are equal and no output is obtained from the terminals 70 between which their difference, i.e. $(E_1-E_2)$ is developed.

As the frequency of the applied wave deviates, the voltages $$\frac{e_s}{2}$$

across the tuned secondary winding 57 vary in phase with respect to the reference voltage $e_p$ to vary the absolute amplitude of the voltages $e_1$ and $e_2$ with respect to each other and thus develop different rectified voltages $E_1$ and $E_2$ across the capacitors 64 and 62, respectively.

Figure 4:
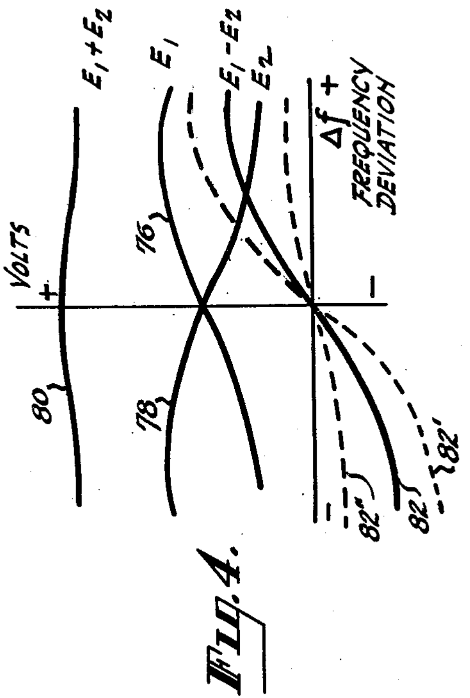
FIGURE 4 is a graph showing curves illustrating the operation of the detector circuit of FIGURE 2.

FIGURE 4 shows the manner in which the various voltages in the circuit vary with frequency deviation. At center frequency, the rectified voltage $E_1$ (shown by curve 76) is equal to the rectified voltage $E_2$ (shown by curve 78). As the frequency of the wave deviates (assuming no amplitude variation of the wave) $E_1$ and $E_2$ change in a nearly complementary fashion such that the sum of $E_1+E_2$ (shown by curve 80) remains nearly constant. It will be seen, however, that the typical S-curve of a discriminator is generated by the subtraction of the voltages $E_1$ and $E_2$ (shown by curve 82), and this is the voltage that appears at output terminals 70. The $E_1-E_2$ characteristics, shown by curve 82 is, of course, the characteristic of the circuit that results in a frequency deviation responsive output signal from the detector.

It may also be seen that as the amplitude of the wave applied to the primary winding of the transformer 56 increases, the voltages $$e_p \text{ and } \frac{e_s}{2}$$

increase, increasing the voltages $e_1$ and $e_2$, causing an increase in the rectified voltages $E_1$ and $E_2$. Conversely, as the amplitude of the wave decreases, the voltages $e_1$ and $e_2$ decrease, decreasing the rectified voltages $E_1$ and $E_2$. This action results in the $E_1+E_2$ curve 80, shown in FIGURE 4, rising and falling along the "volts" axis in rhythm with variations in wave amplitude. Since the sum voltage $E_1+E_2$ are responsive to the amplitude of the wave, a detected AM signal is thus available individually across the resistors 66 and 68 equal to $$\frac{(E_1+E_2)}{2}$$

Also, since the resistors 66 and 68 are grounded at their junction, either polarity of detected amplitude responsive signal may be obtained. A negative detected signal responsive to wave amplitude variations is available at the terminal 72, and a positive detected signal responsive to wave amplitude variations is available at the terminal 74. Note that the $E_1+E_2$ curve 80 in FIGURE 4 varies at its extremities with deviation of the signal. However, there is no significant variation in the $E_1+E_2$ voltage within the operating region of the detector. Thus, there is no significant variation in the $E_1+E_2$ voltage with frequency deviation of the received wave.

Amplitude variations of the wave, however, do affect the output signal at the frequency responsive output terminals 70. This is illustrated in FIGURE 4 by the dashed curves 82' and 82'' compared with the $E_1-E_2$ curve 82. As the wave amplitude is increased, it has been pointed out that the voltages $E_1$ and $E_2$ increase in amplitude. Thus, the difference curve $E_1-E_2$ designated 82 increases in value and changes its slope. An increase in wave amplitude results typically, in a curve such as the dotted curve 82' in which the slope of the linear portion of the curve is increased and the absolute value of the output signal for any given deviation is increased over that shown by the curve 82. The converse is true if the wave amplitude decreases. The slope of the $E_1-E_2$ curve 82 decreases and the absolute voltage output for a given deviation decreases. This action is illustrated in the dotted curve 82''. Thus, the detected output signal from the frequency responsive output terminal 70 is proportional to the product of the frequency deviation and to the amplitude variation of the received wave.

A more detailed discussion of the circuit of FIGURE 3 may be found on pages 201 and 207 of an article entitled "The Ratio Detector," Seeley and Avins, RCA Review, June 1947, volume VIII, No. 2, where the results of certain investigations concerning this circuit are set forth.

The manner in which the circuit behaves when a stereophonic signal, in accordance with the present invention, is applied thereto, may be best explained by reference to Equation 7 which indicates that the angle modulation of the stereophonically modulated wave is proportional to $$\frac{(A-B)}{(1+A+B)}$$

The detected output signal from the terminals 70 has been shown to be proportional to the product of both the angle modulation and amplitude variation of the wave, therefore, the demodulated output at the terminals 70 may be written as:

$$\frac{(A-B)}{(1+A+B)}\cdot(1+A+B) \qquad (8)$$

where $$\frac{(A-B)}{(1+A+B)}$$

is the angle modulation of the wave and $(1+A+B)$ is the amplitude variation of the wave. The $(1+A+B)$ term will cancel and thus, $$\text{terminal to output}=(A-B) \qquad (9)$$

It will thus be seen that if the stereophonically related signals are modulated on the carrier wave in accordance with this invention that a single detector circuit provides demodulated $(A+B)$ and $(A-B)$ signals for use in the stereophonic receiver which will contain no distortion because of cross-talk or intermodulation between the angle modulation and amplitude modulation of the received wave.

The usefulness of the detector circuit shown in FIGURE 2 is not limited, however, only to waves modulated with stereophonic information in accordance with this invention. If, for economic reasons, it is desired to construct a stereophonic receiver which provides less than optimum performance, the detector circuit of FIGURE 2 may be used to demodulate other types of signals, such as the multiplicative stereophonic signal described in the aforementioned Avins and Holt application. The demodulating characteristics of the circuit, when utilized with signals other than those of the present invention, will contain certain distortion components. The distortion, however, may be of such character that the overall performance of the stereophonic receiver is acceptable from a commercial standpoint. Note from FIGURE 4 that at the center frequency of the detector circuit, or null, that there is little cross-talk between the frequency responsive output indicated by the $E_1-E_2$ curve 82 and the amplitude responsive output indicated by the $E_1+E_2$ curve 80. This lack of cross-talk near the null of the detector is independent of the type of signal that is being processed. Thus, a stereophonic signal as described in the aforementioned Avins and Holt application may be detected, although not with optimum results. The detected signal may, however, be acceptable from a practical standpoint, depending upon the standard of performance desired. It will be appreciated that only the angle modulation of the wave may be detected by the detector circuit shown in FIGURE 2, and the amplitude demodulation may be accomplished by a separate envelope detector. If an envelope detector is used, any other type of angle modulation detector may be used that provides an output signal that is proportional to the product of the angle and amplitude modulation, such as the detector described in the aforementioned Seeley Patent 2,101,103.

Referring now to FIGURE 5, there is illustrated a receiver for receiving and reproducing, stereophonically, a wave amplitude modulated and angle modulated with separate stereophonically related signals. The wave is received by an antenna 90 and applied to an RF amplifier 92 and a converter 94 to provide an intermediate frequency wave in a known manner. The intermediate frequency wave from the converter 94 is applied to an intermediate frequency amplifier circuit, including an amplifier tube 96, which circuit may be of known design. The intermediate frequency wave is derived from the anode of the tube 96 and applied to the tuned primary winding of a balanced, phase-shift discriminator transformer 56, which may be identical to the balanced, phase-shift transformer described in connection with FIGURE 2. The detector circuit shown in the receiver of FIGURE 5 is basically the same as that shown in FIGURE 2. Components common to both are referred to by like reference characters. The secondary winding 57 of the transformer 56 is tuned to the intermediate frequency by the capacitor 59 connected thereacross. The upper extremity (as viewed in the drawing) of the secondary winding is connected to the anode of a first diode section 58 of a double diode tube 61, and the lower extremity of the secondary winding 57 is connected to the cathode of a second diode section 60 of the tube 61. The cathode of the first diode section 58 is connected to the anode of the second diode section 60 through two paths (as explained in connection with FIGURE 2), firstly, through the series combination of the load capacitors 62 and 64, and secondly through the series combination of the load resistors 66 and 68. The tertiary winding 69 of the transformer 56 has one extremity connected to the midpoint of the secondary winding. The combined angle and amplitude responsive detected signal (which is the $(A-B)$ signal) is taken from between the junction point of the capacitors 62 and 64 and ground, and applied through a deemphasis network (resistor 100 and capacitor 104) to the control grid 102 of a triode $(A-B)$ amplifier tube 98. Note that the amplitude and angle modulation responsive output signal from the detector is the same as that from the terminals 70 shown in FIGURE 2.

The amplitude responsive output from the detector circuit is taken from the cathode of the first diode section 58 and is applied through a coupling capacitor 106 to the control grid 108 of a triode phase splitter tube 110. The plate load of the phase splitter tube 110 comprises a load resistor 112 connected between the anode 114 and a source of operating potential, +B, for the receiver. The cathode load of the tube 110 comprises a biasing network 116 connected in series with a resistor 118 between the cathode 120 and ground for the receiver. The values of resistors 112 and 118 are chosen equal. The control grid is provided with bias by a resistor 122 connected between the control grid 108 and the junction point of the biasing network 116 and the cathode load resistor 118. There is thus available across the anode load resistor 112 and the cathode load resistor 118 of the tube 110 a pair of oppositely phased audio signals respresentative of the amplitude responsive output of the detector circuit. The amplitude modulation corresponds to the $(A+B)$ signal and thus two polarities of $(A+B)$ signal are available as indicated on the figure.

As mentioned before, the combined amplitude and angle modulation responsive output of the detector circuit is applied to the control grid 102 of the triode tube 98. The tube is biased by a biasing network 126 connected between the cathode 128 and ground. The anode load circuit comprises a pair of resistors 130 and 132 connected between the anode 134 and the source of operating potential +B. There is thus available at the junction of the anode load resistors 130 and 132 an audio signal representative of the combined angle and amplitude responsive output of the detector circuit, that is, the $(A-B)$ signal.

The three output signals, $(A-B)$ and two polarities of $(A+B)$, are applied to a matrixing network which comprises four resistors of equal value connected in series and designated on the drawing as resistors 136, 138, 140, and 142. The negative polarity, with respect to ground, of the $(A+B)$ signal is applied to the one end of the matrixing circuit at resistor 136, and the positive polarity of the $(A+B)$ signal is applied to the other end of the matrixing circuit at resistor 142. The proper amount of $(A-B)$ signal from the tube 98 is applied to the center of the matrixing circuit at the junction of resistors 138 and 140. The amount of the $(A-B)$ is determined by the ratio of the value of resistor 130 to the sum of the values of resistors 130 and 132. The A signal is derived from the junction of the resistors 140 and 142 across the potentiometer 146, and the B signal is derived from the junction of the resistors 136 and 138 across the potentiometer 144. The A signal is applied from the potentiometer 146 to an "A" audio amplifier 152 and loudspeaker 154, and the "B" signal is applied from the potentiometer 144 to an audio amplifier 148 and a loudspeaker 150. Thus, the detected $(A-B)$ and $(A+B)$ signals are matrixed together to provide the A and B signals which are reproduced stereophonically in the loudspeakers 150 and 152.

It is important that the transformer 56 have its primary and secondary winding 57 tuned to the center frequency of the wave being demodulated. The reason for this may be best explained with reference to FIGURE 4. The normal tuning of the detector is such that the center frequency of the wave is at point "O" on the curves of FIGURE 4. This point is called the null of the detector circuit. If the center frequency of the wave differs from this null point, it may be seen that there is an output at the combined frequency and amplitude responsive terminals (terminals 70 of FIGURE 3) at all times. There would thus be cross-talk or intermodulation between the detected $(A+B)$ and $(A-B)$ signals. In order to prevent this cross-talk, a self-tuning circuit has been provided for the secondary winding 57 of the discriminator transformer 56 by utilizing as a control voltage, the voltage at the cathode of $(A-B)$ amplifier tube 98. The voltage appearing at the cathode is applied through a resistor 157 to the base electrode 156 of a transistor 158. The emitter 160 of the transistor is biased by being connected to the junction of a pair of resistors 162 and 164 which are serially connected between the source of operating potential, +B, for the receiver and ground. The collector electrode 166 is connected to the source of operating potential +B through a collector load resistor 168 and is further connected to ground by a second collector resistor 169.

When the secondary winding 57 of the transformer 56 is properly tuned to the wave frequency, there will be substantially zero direct voltage on the grid 102 of the amplifier tube 98 (as shown by the $E_1-E_2$ curve 82 of FIGURE 7), and the current through the tube 98 will fix the cathode at some small positive value related to the voltage on the control grid 102. If the direct voltage on the control grid 102 should change because of mistuning of the secondary winding 57 with respect to the received wave, the voltage on the cathode 128 will change, changing the voltage at the base electrode 156 of the transistor 158. This change in base voltage will result in a change in the collector voltage. Thus, there is available at the collector 166 an amplified voltage indicative of the mistuning of the secondary winding 57 of the transformer 56.

In order to automatically control the tuning of the secondary winding 57, a variable capacitance semi-conductor diode 170 is connected across the secondary winding 57 by means of a pair of capacitors 172 and 174. The diode 170 is reverse biased by connecting its anode to ground through a resistor 176 and the cathode to the collector electrode 166 of the transistor 158 through an isolating resistor 178. A positive voltage thus appears, normally, on the cathode of the diode 170, biasing it in the reverse direction. It will now be seen that a change in the direct voltage on the control grid 102 of the $(A-B)$ amplifier tube 98 will result in a change in voltage on the cathode 128, which, in turn, results in an amplified voltage change on the collector electrode of the transistor 158. The amplified voltage change is applied to the cathode of the diode 170, altering its capacitance such as to change the resonant frequency of the secondary winding 57 of the transformer 56 to correspond with center frequency of the wave being received. By this means, the null of the detector circuit is kept substantially at the center frequency of the incoming wave, and cross-talk or intermodulation between the $(A-B)$ or $(A+B)$ channels of the receiver is substantially eliminated.

Typical values for the components of the circuit of

FIGURE 5 are shown on the drawing. All resistances are in ohms and all capacitances are in micromicrofarads, unless otherwise noted. Tube 61 is the double diode section of a type 6BN8 tube and tube 98 is the triode section of the same 6BN8. The phase splitter tube 110 is a type 12AU7 tube, and the transistor 158 is a type 2N214 NPN transistor. The diode 170 is three Pacific Semiconductor, Inc. type U33 diodes in parallel and the +B voltage is 110 volts. The value of resistor 100 is selected to provide with the capacitor 104 a deemphasis corresponding to the preemphasis applied to the $(A-B)$ signal at the transmitter. A switch 180 is provided to ground the output signal of the $(A-B)$ amplifier tube 98 when only a monophonic wave is being received.

The detector circuit shown in FIGURE 5 includes deemphasis network including resistor 100 and capacitor 104. It will of course be appreciated that if the angle modulation at the transmitter partakes of the characteristics of phase modulation rather than frequency modulation a suitable integrating network is disposed between the detector and the amplifier stage 98.

Having described the invention, what is claimed is:

1. A transmitter for providing a wave modulated in angle and amplitude by a pair of stereophonically related signals comprising in combination: a source of radio frequency waves, means for generating a pair of stereophonically related signals, means for amplitude modulating said waves as a function of one of said stereophonically related signals to provide a wave envelope, means for angle modulating said waves such that the angle modulation of said waves is a direct function of the other of said stereophonically related signals and an inverse function of the wave envelope, and means for radiating said waves.

2. A stereophonic sound signalling system for transmitting and receiving a wave modulated in angle and amplitude with stereophonic information, said system comprising: means for generating a pair of stereophonically related audio frequency signals; means for amplitude modulating a wave as a direct function of one of said stereophonically related signals to provide a wave envelope; means for angle modulating said wave such that the angle modulation imparted to said wave is a direct function of the other of said stereophonically related signals and an inverse function of the wave envelope; means for radiating said resultant modulated wave; and receiving means comprising; means for deriving from the amplitude modulation on said wave a first detected signal corresponding to the one of said stereophonically related signals, means responsive to the product of the angle modulation and the amplitude modulation on said wave for deriving a second detected signal corresponding to said other of said stereophonically related signals, and signal utilization means for said detected signals.

3. In a stereophonic signal receiver for the reception of a wave envelope modulated by a first of a pair of stereophonically related signals and angle modulated by a second of said pair of stereophonically related signals a modulation detector circuit for said wave including a transformer having a primary and a secondary winding resonant to the center frequency of the wave, means for establishing the midpoint of the secondary winding at the alternating potential of a point on the primary winding, a pair of rectifiers, means connecting the anode of one and the cathode of the other rectifier to the extremities of the secondary winding, a pair of series connected capacitors and a resistor connected in parallel, means connecting said pair of series connected capacitors and parallel resistor between the cathode of the one and the anode of the other of said pair of rectifiers, a connection from the junction of said series connected capacitors to the secondary winding, and means for deriving a first output determined by the second of the signals from said junction and a point on the resistor, a second output determined by the first of the signals from a terminal of one of said capacitors and the said point on the resistor and means connected to said modulation detector circuit which is responsive to said first and second outputs for driving a pair of sound reproducing devices in stereophonic relation.

4. A detector circuit for a wave envelope modulated by one of a pair of stereophonically related signals and concurrently angle modulated by the product of the other signal and the reciprocal of the envelope comprising, a transformer having a primary and a secondary winding resonant to the center frequency of the wave, means for establishing the midpoint of the secondary winding at the alternating potential of a point on the primary winding, a pair of rectifiers, means connecting the anode of one and the cathode of the other rectifier to the extremities of the secondary winding, a pair of series connected capacitors and a resistor connected in parallel, means connecting said series connected capacitors and parallel resistor between the cathode of the one and the anode of the other of said pair of rectifiers, and means for deriving a first output signal corresponding to the second of the signals from the junction of said series connected capacitors and a point on the resistor, means for deriving a second output signal corresponding to the first of said signals from a terminal of one of said capacitors and said point on the resistor, a pair of sound reproducing devices, and means responsive to said first and second output signals for driving said pair of sound reproducing devices in stereophonic relation.

5. A stereophonic signal receiver for the reception of a radio frequency wave envelope modulated as the function of the sum of a pair of stereophonically related signals and angle modulated as a function of the difference between said pair of stereophonically related signals comprising the combination of a modulation detector circuit for said radio frequency wave including resonant circuit components and only two rectifiers, means connecting said modulation detector circuit to include a first pair of terminals between which a signal corresponding to said angle modulation is developed, and a second pair of terminals between which a signal corresponding to said envelope modulation is developed, and means to combine the signals corresponding to said angle modulation and envelope modulation of said radio frequency carrier wave to provide resultant signals corresponding respectively to said pair of stereophonically related signals.

6. A stereophonic signal receiver for the reception of a radio frequency wave envelope modulated as the function of the sum of a pair of stereophonically related signals and angle modulated as a function of the difference between said pair of stereophonically related signals comprising the combination of a modulation detector circuit for said radio frequency wave including a transformer having a primary winding and a secondary winding and only two rectifiers, means connecting said modulation detector circuit to include a first pair of terminals between which a signal corresponding to said angle modulation is developed, and a second pair of terminals between which a signal corresponding to said envelope modulation is developed, a first and second amplifier stage each having an input circuit and an output circuit, the input circuit of said first amplifier stage coupled to said first pair of terminals and the input circuit of said second amplifier stage coupled to said second pair of terminals and matrixing circuit means coupled to the output circuits of said first and second amplifiers to receive and combine the signals corresponding to said angle modulation and envelope modulation of said radio frequency carrier wave and provide resultant signals corresponding respectively to said pair of stereophonically related signals.

7. A stereophonic signal receiver for the reception of a radio frequency wave envelope modulated as the function of the sum of a pair of stereophonically related signals and angle modulated as a function of the difference between said pair of stereophonically related signals, comprising the combination of a modulation detector circuit for said radio frequency wave including a transformer having a primary winding and a secondary winding resonant at the center frequency of said radio frequency wave, means for establishing the midpoint of the secondary winding at the alternating potential of a point on the primary winding, a pair of rectifiers, means connecting the anode of one and the cathode of the other rectifier to the extremities of the secondary winding, a pair of impedance elements and a resistor connected in parallel, means connecting one terminal of the impedance elements and the resistor to the cathode of one and the other terminal of the impedance elements and the resistor to the anode of the other rectifier, a connection from the junction of the impedance elements to the secondary winding whereby a signal output corresponding to the angle modulation of said radio frequency carrier wave may be derived between the junction of the impedance elements and a point of reference potential for said detector circuit, and a signal output corresponding to the envelope modulation of said radio frequency carrier wave may be derived between one extremity of said resistor and a point of reference potential, and means to combine said signal outputs corresponding to the angle modulation and envelope modulation of said radio frequency carrier wave to provide a pair of signals corresponding respectively to said pair of stereophonically related signals.

8. A stereophonic signal receiver for the reception of a radio frequency wave envelope modulated as the function of the sum of a pair of stereophonically related signals and angle modulated as a function of the difference between said pair of stereophonically related signals, comprising the combination of a modulation detector circuit for said radio frequency wave including a transformer having a primary winding and a secondary winding resonant at the center frequency of said radio frequency wave, means for establishing the midpoint of the secondary winding at the alternating potential of a point on the primary winding, a pair of rectifiers, means connecting the anode of one and the cathode of the other rectifier to the extremities of the secondary winding, a pair of impedance elements and a resistor connected in parallel, means connecting one terminal of the impedance elements and the resistor to the cathode of one and the other terminal of the impedance elements and the resistor to the anode of the other rectifier, a connection from the junction of the impedance elements to the secondary winding whereby a signal output corresponding to the angle modulation of said radio frequency carrier wave may be derived between the junction of the impedance elements and a point of reference potential for said detector circuit, and a signal output corresponding to the envelope modulation of said radio frequency carrier wave may be derived between one extremity of said resistor and a point of reference potential, a first amplifier stage having an input circuit coupled between the junction of said impedance elements and a point of reference potential, a second amplifier stage having an input circuit coupled between one extremity of said resistor and a point of reference potential, one of said first and second amplifiers comprising a phase splitter for providing in its output circuit two signals of opposite phase, and matrixing circuit means coupled to the output circuits of said first and second amplifier stages to receive and combine said signal outputs corresponding to the angle modulation and envelope modulation of said radio frequency carrier wave to provide a pair of signals corresponding respectively to said pair of stereophonically related signals.

9. A stereophonic signal receiver for the reception of a radio frequency wave envelope modulated as the function of a first of a pair of stereophonically related signal and angle modulated as a function of a second of said pair of stereophonically related signals comprising the combination of a modulation detector circuit for said radio frequency wave including a transformer having a primary winding and a secondary winding resonant to the center frequency of said radio frequency wave and a pair of rectifiers, means connecting said modulation detector circuit to provide a first signal output corresponding to the angle modulation of said radio frequency wave and a second signal output corresponding to said envelope modulation of said radio frequency wave, a first amplifier stage coupled to said modulation detector circuit to receive and translate said second signal output, a second amplifier stage coupled to said modulation detector circuit to receive and translate said first signal, means connecting said second stage to provide a direct voltage which varies in amplitude as a function of the level of said first signal, voltage responsive reactance means coupled across said secondary winding, and means for applying said direct voltage to said voltage responsive reactance means to maintain said secondary winding tuned to the center frequency of said radio frequency wave.

10. A stereophonic signal receiver for the reception of a radio frequency wave amplitude modulated as the function of the sum of a pair of stereophonically related signals and angle modulated as a function of the difference between said pair of stereophonically related signals comprising the combination of a modulation detector circuit for said radio frequency wave including a pair of rectifiers, signal translating means for applying a received radio frequency wave signal including any amplitude modulation components thereof to said modulation detector circuit, means connecting said rectifiers in said modulation detector circuit to develop a signal corresponding to said angle modulation between a first pair of terminals, and connecting at least one of said rectifiers in circuit to develop a signal corresponding to said envelope modulation between a second pair of terminals and matrixing circuit means coupled to said modulation detector circuit to receive and combine the signals corresponding to said angle modulation and envelope modulation of said radio frequency carrier wave to provide resultant signals corresponding respectively to said pair of stereophonically related signals.

References Cited in the file of this patent

UNITED STATES PATENTS

| | | |
|---|---|---|
| 2,382,014 | Lange | Aug. 14, 1945 |
| 2,512,530 | O'Brien et al. | June 20, 1950 |
| 2,561,088 | Anderson | July 17, 1951 |

OTHER REFERENCES

Seeley et al.: RCA Review, June 1947, vol. VIII, No. 2, p. 201.

Sweeney et al.: article, Westinghouse Engineer, July 1959, pp. 122–125.